US012723974B2

(12) United States Patent
Sumii et al.

(10) Patent No.: US 12,723,974 B2
(45) Date of Patent: Sep. 1, 2026

(54) INSPECTION DEVICE AND INSPECTION METHOD

(71) Applicants: TAIKISHA LTD., Tokyo (JP); SUBARU CORPORATION, Tokyo (JP)

(72) Inventors: Tadashi Sumii, Tokyo (JP); Hidetsugu Nosaka, Tokyo (JP); Tatsuya Hirose, Tokyo (JP); Yusuke Tsurui, Tokyo (JP)

(73) Assignees: TAIKISHA LTD., Tokyo (JP); SUBARU CORPORATION, Tokyo (JP)

( * ) Notice: Subject to any disclaimer, the term of this patent is extended or adjusted under 35 U.S.C. 154(b) by 127 days.

(21) Appl. No.: 18/515,861

(22) Filed: Nov. 21, 2023

(65) Prior Publication Data

US 2024/0175805 A1 May 30, 2024

(30) Foreign Application Priority Data

Nov. 25, 2022 (JP) ................................ 2022-188319

(51) Int. Cl.
*G01N 21/25* (2006.01)
*B25J 19/02* (2006.01)
(Continued)

(52) U.S. Cl.
CPC ............ *G01N 21/251* (2013.01); *B25J 19/02* (2013.01); *G01B 17/025* (2013.01); *G01L 5/0061* (2013.01); *G01N 35/0099* (2013.01)

(58) Field of Classification Search
CPC ............ G01N 21/251; G01N 35/0099; G01N 2021/9518; G01N 21/9515; B25J 19/02; G01B 17/025; G01L 5/0061
See application file for complete search history.

(56) References Cited

U.S. PATENT DOCUMENTS

2021/0003535 A1* 1/2021 Mine ..................... G01N 29/11
2022/0228851 A1* 7/2022 Miao .................... G01B 11/005
(Continued)

FOREIGN PATENT DOCUMENTS

CN 113501406 A * 10/2021 .......... B66C 1/0218
JP 8-75663 3/1996
(Continued)

OTHER PUBLICATIONS

Notice of Reason for refusal issued in JP patent application No. 2022-188319, dated May 12, 2026, and English translation.

*Primary Examiner* — Thanh Luu
*Assistant Examiner* — Mai Thi Ngoc Tran
(74) *Attorney, Agent, or Firm* — GREENBLUM & BERNSTEIN, P.L.C.

(57) ABSTRACT

Provided are an inspection device and an inspection method capable of controlling the positional relationship between a device and a measurement object to achieve an attitude enabling an appropriate detection of the surface conditions. The inspection device includes: a detector including a transmitter configured to transmit a transmission wave to a measurement object and a receiver configured to receive a return wave generated as a result of the transmission wave hitting the measurement object; and at least one sucker configured to suck the measurement object to regulate respective positions of the measurement object and the detector relative to each other.

16 Claims, 4 Drawing Sheets

(51) Int. Cl.

| | |
|---|---|
| ***G01B 17/02*** | (2006.01) |
| ***G01L 5/00*** | (2006.01) |
| ***G01N 35/00*** | (2006.01) |

(56) References Cited

U.S. PATENT DOCUMENTS

| | | | | |
|---|---|---|---|---|
| 2023/0251204 | A1* | 8/2023 | Horikawa .......... | G01N 29/2418 |
| 2023/0278208 | A1* | 9/2023 | Mizoguchi ........... | B25J 15/0028 |

FOREIGN PATENT DOCUMENTS

| | | |
|---|---|---|
| JP | 2007-278809 | 10/2007 |
| JP | 2011-27599 | 2/2011 |
| JP | 2014-176926 | 9/2014 |
| JP | 2017-58139 | 3/2017 |

* cited by examiner

INSPECTION DEVICE AND INSPECTION METHOD

BACKGROUND OF THE INVENTION

1. Field of the Invention

The present invention relates to an inspection device and an inspection method.

2. Description of the Related Art

In various industrial fields typified by painting, coating, and the like, interest has been drawn to the states of the surfaces of products and the like, and various devices detecting the states of the surfaces of measurement objects have been proposed.

For example, Japanese Unexamined Patent Application Publication No. 2011-27599 (Patent Literature 1) discloses an inspector comprising a plurality of attachments, and the inspector enables the inspection of the color, glossiness, bronzing, and the like of an inspection object with a single light source and a single sensor by selecting each attachment as appropriate for use. Further, Japanese Unexamined Patent Application Publication 2017-58139 (Patent Literature 2) discloses a colorimeter that suppresses the incidence of infrared light into a light receiving section.

SUMMARY OF THE INVENTION

To accurately perform various measurements to detect the surface conditions, it has been required to appropriately control the positional relationship between a device carrying out the measurements and a measurement object. Since this type of device detects the surface conditions by applying some physical action to the surface of the measurement object or a base covered with paint or the like, and detecting the reaction in many cases, it has been desired that the device is arranged in an appropriate attitude with respect to the surface of the measurement object for an improvement of the measurement accuracy. However, the technologies of Patent Literatures 1 and 2 have not sufficiently examined the positional relationship between the device carrying out the measurements and the measurement object.

Therefore, an inspection device and an inspection method capable of controlling the positional relationship between the device and the measurement object to achieve an attitude enabling appropriate detection of the surface conditions have been demanded.

An inspection device according to the present invention includes: a detector including (i) a transmitter configured to transmit a transmission wave to a measurement object and (ii) a receiver configured to receive a return wave generated as a result of the transmission wave hitting the measurement object; and at least one sucker configured to suck the measurement object to regulate respective positions of the measurement object and the detector relative to each other.

An inspection method according to the present invention involving use of an inspection device including: a detector including (i) a transmitter configured to transmit a transmission wave to a measurement object and (ii) a receiver configured to receive a return wave generated as a result of the transmission wave hitting the measurement object; and a sucker configured to suck the measurement object, the inspection method comprising: sucking the measurement object with use of the sucker; and detecting, with use of the detector, a condition of a surface of the measurement object sucked with use of the sucker.

According to these configurations, the sucker can regulate the relative position between the measurement object and the detector, and therefore the attitude enabling the appropriate detection of the surface condition can be achieved.

Hereinafter, suitable modes of the present invention are described. However, the scope of the present invention is not limited by suitable mode examples described below.

Further features and advantages of the present invention will be more apparent by the following illustrative and non-limiting description of embodiments, which is described with reference to drawings.

DESCRIPTION OF THE PREFERRED EMBODIMENTS

Embodiments of an inspection device and an inspection method according to the present invention are described with reference to the drawings. Hereinafter, an example is described in which the inspection device according to the present invention is applied to an inspection device 1 used for an inspection of an automobile bumper B (which is an example of a measurement object, and hereinafter simply referred to as a “bumper B”) and an inspection method including inspecting the bumper B using the inspection device 1. The bumper B has been painted before inspected with the inspection device 1. The purpose of the inspection with the inspection device 1 is to evaluate the painting quality. The bumper B is conveyed by a conveyance device (not illustrated) to enter a booth where the inspection device 1 is installed and undergo the inspection in the booth.

[Configuration of Inspection Device]

Figure 1:
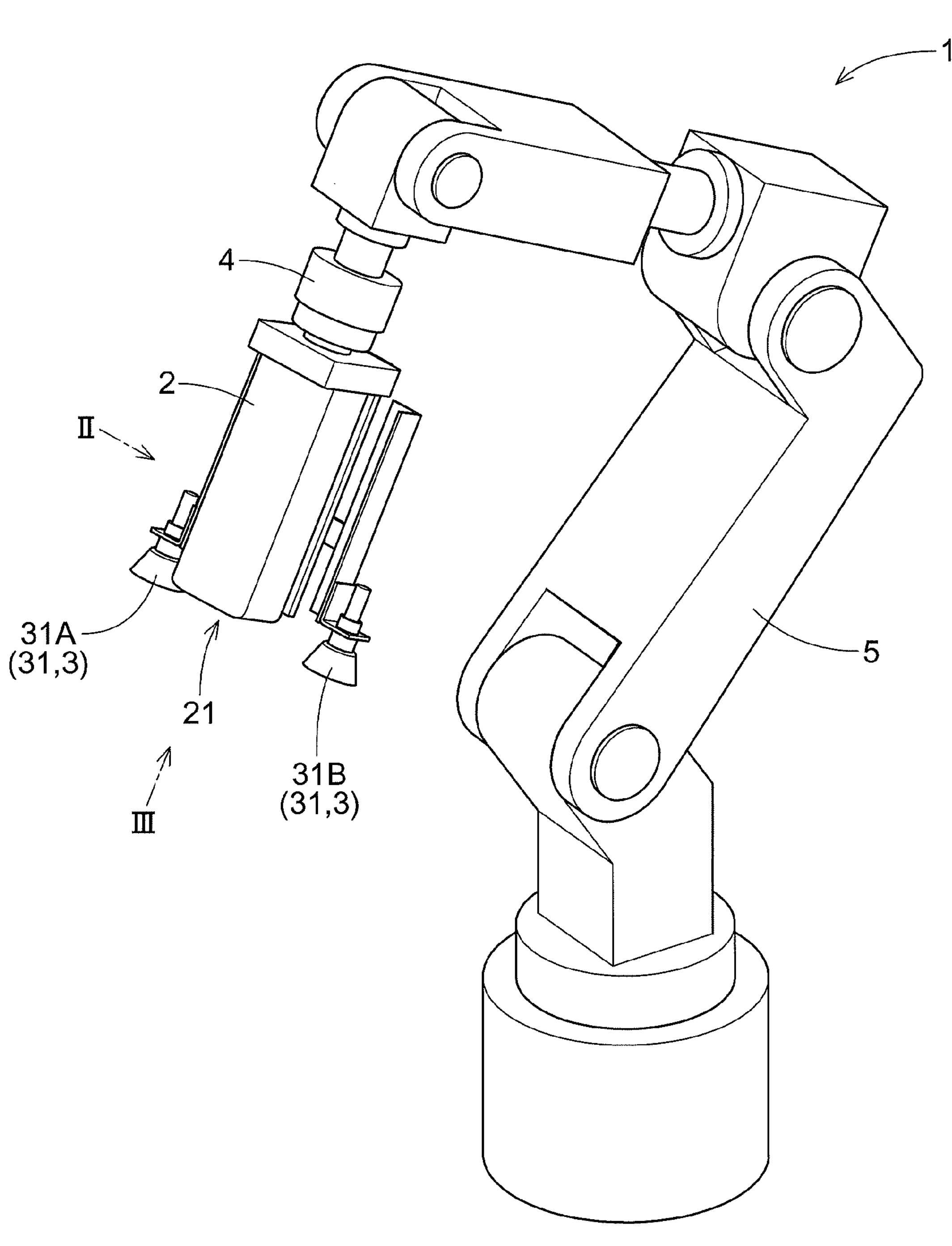
FIG. 1 is a perspective view of an inspection device according to an embodiment.
Figure 2:
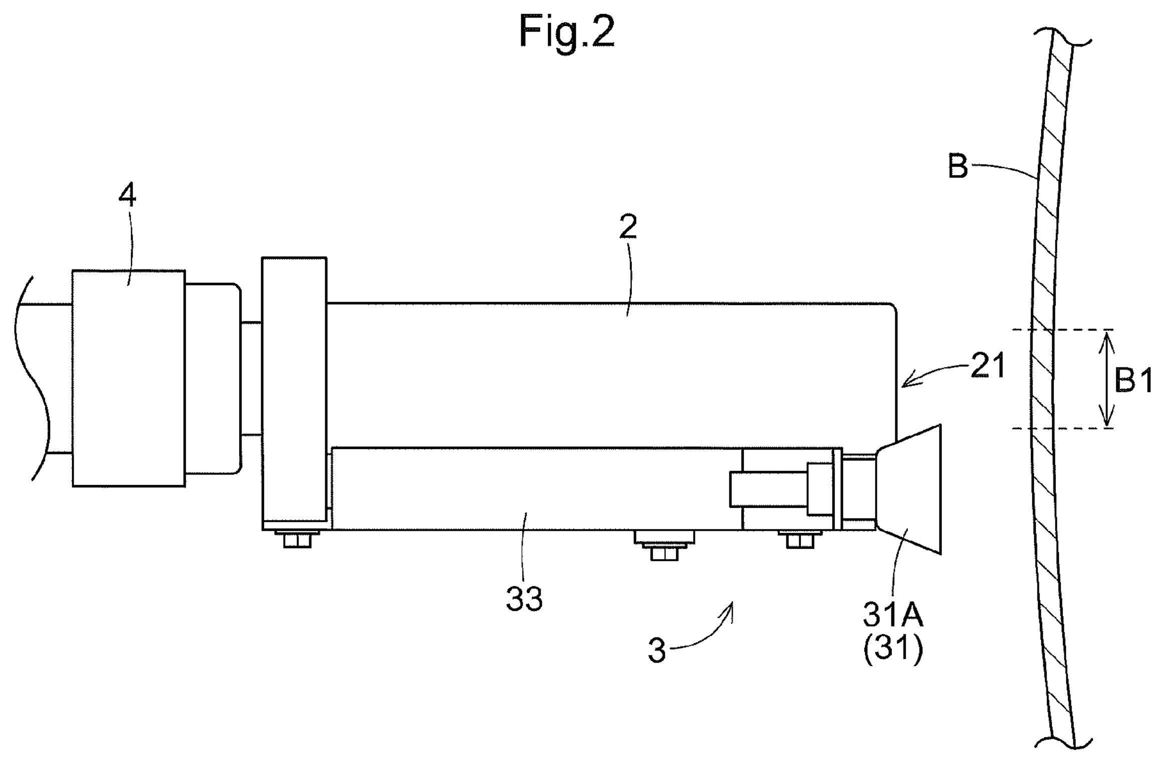
FIG. 2 is a view of a detector and a sucker as viewed in the direction of the line II in FIG. 1.
Figure 3:
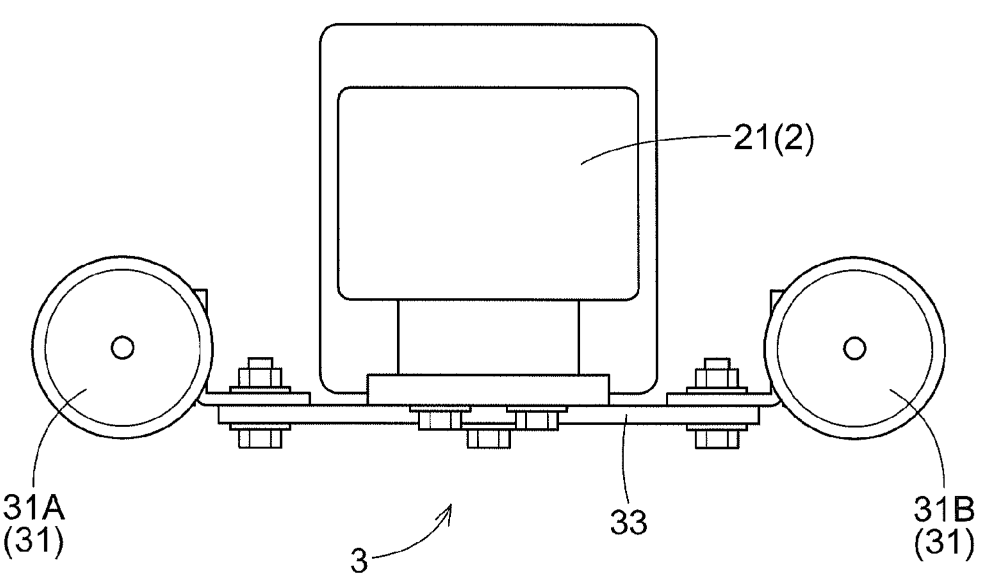
FIG. 3 is a view of the detector and the sucker as viewed in the direction of the line III in FIG. 1.
Figure 4:
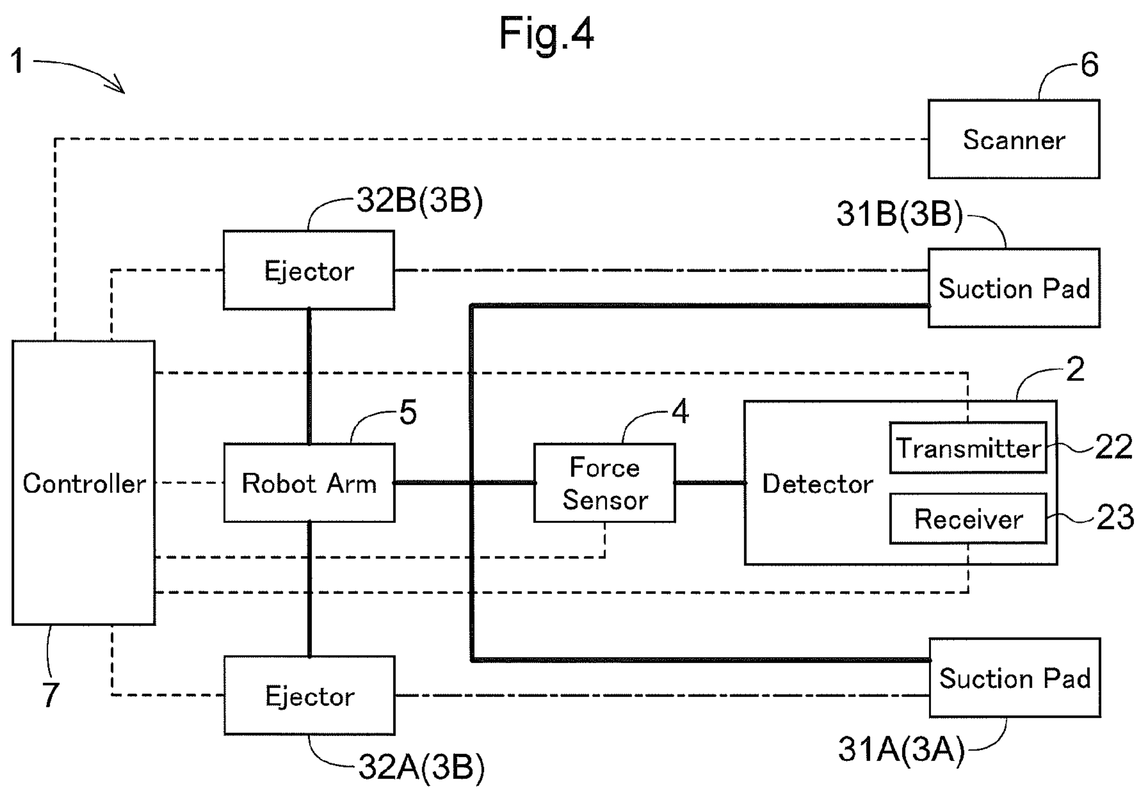
FIG. 4 is a block diagram illustrating the configuration of an inspection device according to the embodiment.

The inspection device 1 according to this embodiment includes a detector 2, suckers 3, a force sensor 4, a robot arm 5 (an example of a driver), a scanner 6 (an example of a position detector), and a controller 7 (FIGS. 1 to 4). The detector 2 and the suckers 3 are held by the tip of the robot arm 5, and the detector 2 is held via the force sensor 4. The detector 2, the suckers 3, the robot arm 5, the scanner 6, and the force sensor 4 are all communicable with the controller 7. In FIG. 4, regarding the relationship between each element, the mechanical connections are illustrated by solid lines, piping connections are illustrated by dashed lines, and electrical connections are illustrated by broken lines.

The detector 2 is a device detecting the surface condition of the bumper B. The purpose of the inspection with the inspection device 1 is to evaluate the painting quality of the bumper B. The detector 2 can be specifically a device known as a device, such as a colorimeter, a film thickness gauge, or a flaw detection tester, or a device containing the measuring instruments in combination.

As is clear from the example above, the detector 2 is typically a contact-type measuring instrument, and detects the surface condition with an contact surface 21 of the detector 2 in contact with a measurement site B1 as a measurement target of the bumper B. In this case, the contact surface 21 is desirably made to abut on the measurement site B1 with an appropriate force to appropriately perform the measurements using the detector 2. The magnitude of the appropriate force as used herein is determined by the specification of the detector 2 and the rigidity of the measurement object (bumper B in this embodiment), for example. More specifically, the magnitude of the appropriate force can be determined to avoid error factors, such as a deformation of the measurement object (bumper B) and the entry of ambient light into the detector 2.

The detector 2 may be a contactless measuring instrument. In this case, it is desirable to appropriately control the relative position between the contact surface 21 and the measurement site B1 to appropriately perform the measurements using the detector 2. More specifically, it is desirable that the relative position between the contact surface 21 and the measurement site B1 conforms to the specification of the detector 2 and is reproduced in a plurality of measurements. Herein, for a description in common with the case where the detector 2 is the contact-type measuring instrument, the "contact" surface is used for convenience. However, when the detector 2 is the contactless measuring instrument, the contact surface 21 does not contact the measurement object.

The suckers 3 are devices sucking the bumper B. The suckers 3 are, for example, vacuum suckers, and each include a suction pad 31 contacting the bumper B, an ejector 32 connected to the suction pad 31, and a bracket 33 holding the suction pads 31A, 31B (FIGS. 1 to 4). The brackets 33 extend in parallel to the detector 2.

The detector 2 has a transmitter 22 transmitting a transmission wave to the measurement object, and a receiver 23 receiving a return wave generated by the hitting of the transmission wave to the measurement object. The detector 2 detects the surface condition of the measurement object by transmitting the transmission wave to apply some effect to the measurement object, and detecting the return wave generated by the action.

As a first example, when the detector 2 is a colorimeter, the transmitter 22 is a light source emitting visible light to the measurement object, and the receiver 23 is an optical sensor detecting reflected light. In this example, the emission of the visible light corresponds to the transmission of the transmission wave, and the detection of the reflected light corresponds to the reception of the return wave. When the wavelength of the emitted visible light is fixed, the wavelength of the reflected light depends on the color tone of the surface of the measurement object, and therefore the color tone of the surface of the measurement object can be determined by detecting the reflected light.

As a second example, when the detector 2 is an ultrasonic film thickness gauge, the transmitter 22 is an ultrasonic wave source transmitting an ultrasonic wave to the measurement object, and the receiver is a receiver receiving the ultrasonic wave reflected on the measurement object. Herein, the transmission of the ultrasonic wave corresponds to the transmission of the transmission wave, and the reception of the reflected ultrasonic wave corresponds to the reception of the return wave. In this example, the thickness of a coating film is determined based on the time until the ultrasonic wave transmitted by the transmitter 22 is reflected on a base of the measurement object and detected with the receiver 23.

As a third example, when the detector 2 is a flaw detection testing machine, one coil serves as both the transmitter 22 and the receiver 23, and the coil transmits an electromagnetic wave generating an eddy current to the measurement object and detects a change in a magnetic field caused by the eddy current, whereby the presence or absence of flaws is identified. Herein, the transmission of the electromagnetic wave corresponds to the transmission of the transmission wave, and the detection of the magnetic field corresponds to the reception of the return wave.

As described above, the transmission wave is any wave determined according to the detection principle of the detector 2, and may be an electromagnetic wave, such as ultraviolet light, visible light, infrared light, or a microwave, or a sound wave in an ultrasonic wave band, an audible band, or an ultra-low frequency band, for example, but is not limited thereto. The return wave is determined by the type of the transmission wave and the physical properties of a detection target, and may be one generated by the reflection of the transmission wave, one generated by the induction by the transmission wave, or the like.

The suction pads 31 are formed of an elastically deformable member (for example, polypropylene). Since the detector 2 and the suckers 3 (suction pads 31) are both held by the robot arm 5, the relative position between the bumper B (particularly the measurement site B1) and the detector 2 (particularly the contact surface 21) can be regulated by the sucking of the bumper B with the suckers 3. In this embodiment, the two suckers 3 (3A, 3B) are provided, and the suckers 3A, 3B individually and independently have the suction pads 31A, 31B and ejectors 32A, 32B, respectively. The ejectors 32A, 32B are fixed to the robot arm 5.

The detector 2 and the suckers 3A, 3B are provided such that the contact surface 21 is arranged at a position deviated from the straight line connecting the two suction pads 31A, 31B (FIG. 3). More specifically, the contact surface 21 and the two suction pads 31A, 31B are provided to be arranged such that a plane can be defined by the three points. With this arrangement, when the contact surface 21 and the suction pads 31A, 31B all contact the bumper B, the contacting state is easily stabilized. The positions of the contact surface 21 and the suction pads 31A, 31B as used herein are specified by the center of each member as viewed from the direction facing the contact surface 21 (i.e., viewpoint of FIG. 3).

In the normal state of the suckers 3, the suction pads 31 are positioned ahead of the contact surface 21. Herein, the ahead refers to the direction in which the contact surface 21 is brought closer to the measurement site B1 (right direction in FIG. 2), and the behind refers to the opposite direction.

The suction pads 31 are positioned ahead of the contact surface 21, and therefore, when the detector 2 and the suckers 3 are brought closer to the bumper B (measurement site B1), the suction pads 31 are closer to the bumper B before the detector 2. When the distance between the suction pads 31 and the bumper B decreases, a measurable state is completed in such an order that the bumper B is attracted to the suction pads 31, and then the contact surface 21 contacts on the measurement site B1. The suction pads 31 are deformed in sucking the bumper B, and do not prevent the contact of the contact surface 21 arranged behind the suction pads 31 on the bumper B.

Conventionally, when the detector is pressed against the measurement object, the rigidity of which is low, for example, it has been required to press the detector and the measurement object from the rear side of the measurement object. This is because, when the detector has been pressed against the measurement object without pressing the rear side, the measurement object has been deformed, damaging the quality, and it has been difficult to achieve an appropriate measurement attitude in the first place. On the other hand, this embodiment achieves the measurement attitude by attracting the measurement object by the action of the suckers 3, and therefore the appropriate measurement attitude can be achieved without pressing the measurement object from the rear side.

The force sensor 4 is provided to be arranged between a base end of the detector 2 (opposite to the contact surface 21) and the robot arm 5. When the detector 2 is pressed against the bumper B, the force sensor 4 can detect the pressing force.

It is not precluded in this embodiment to perform the measurements by a method including pressing the detector 2 against the bumper B (i.e., the same method as that of the conventional inspection device) instead of the method including causing the suckers 3 to suck the bumper B. The force sensor 4 serves to facilitate the achievement of the appropriate measurement attitude when the measurement is performed in this mode. More specifically, the magnitude (high or low) of the pressing force can serve as an index of the appropriateness of the attitude in which the detector 2 is made to contact the bumper B in the mode of pressing the detector 2 against the bumper B. Therefore, when the robot arm 5 is controlled such that the pressing force is at an appropriate level, the appropriate measurement attitude can be achieved. More specifically, the detector 2 may be moved such that the force detected with the force sensor 4 falls within a predetermined range.

As the robot arm 5 according to this embodiment, one known as a six-axis vertical articulated industrial robot is usable, for example. The robot arm 5 can move the detector 2 and the suckers 3 mounted on the tip to a desired position in a desired path. The operation of the robot arm 5 is controlled according to a teaching program stored in advance in the controller 7. The form of such a teaching program may be any form, and a form of storing teaching points in the form of each axis pulse, a form of storing teaching points in the form of a world coordinate system space coordinate, or the like is usable.

The scanner 6 is a device capable of scanning the bumper B and three-dimensionally detecting the position and the shape of the bumper B. The scanner 6 is provided separately from a unit containing the detector 2, the suckers 3, the robot arm 5, and the force sensor 4 in a booth where the inspection device 1 is installed.

The controller 7 is a device controlling the operation of each section of the inspection device 1, and one known as a control device controlling the operation of an industrial robot (robot arm 5 in this embodiment) is usable. The controller 7 also serves to control the detector 2, the suckers 3, the force sensor 4, and the scanner 6 and process detected signals.

[Control of Inspection Device and Inspection Method]

Next, an inspection method using the inspection device 1 is described. Hereinafter, an example in which the detector 2 is a contact-type measuring instrument is described. The inspection method according to this embodiment includes a first stage of causing the suckers 3 to suck the bumper B, a second stage of bringing the detector 2 into contact with the bumper B sucked to the suckers 3, and a third stage of detecting the surface condition of the bumper B sucked to the suckers 3 with the detector 2.

The operation of each section of the inspection device 1 to implement the series of procedures is controlled by the controller 7. Before starting the series of procedures, the inspection device 1 is in a state where the detector 2 and the suckers 3 are positioned away from the bumper B and the suction pads 31 are positioned ahead of the contact surface 21 (FIG. 2).

(1) First Stage

When the bumper B as a measurement target is brought into the booth where the inspection device 1 is installed, the scanner 6 scans the bumper B and three-dimensionally detects the position and the shape of the bumper B (position specifying step). A detection signal of the scanner 6 is input into the controller 7. The controller 7 compares the position and the shape of the bumper B in pre-entered master data with the position and the shape of the bumper B actually measured with the scanner 6, and specifies the degree of divergence between the master data and the current state.

Subsequently, the controller 7 corrects information in the master data regarding the position of the measurement site B1 and the attitude in which the detector 2 and the suckers 3 are made to contact the measurement site B1 based on the specified degree of divergence. Thereafter, the robot arm 5 is operated based on the specified information to move the detector 2 and the suckers 3 to the measurement site B1 (moving step).

Figure 5:
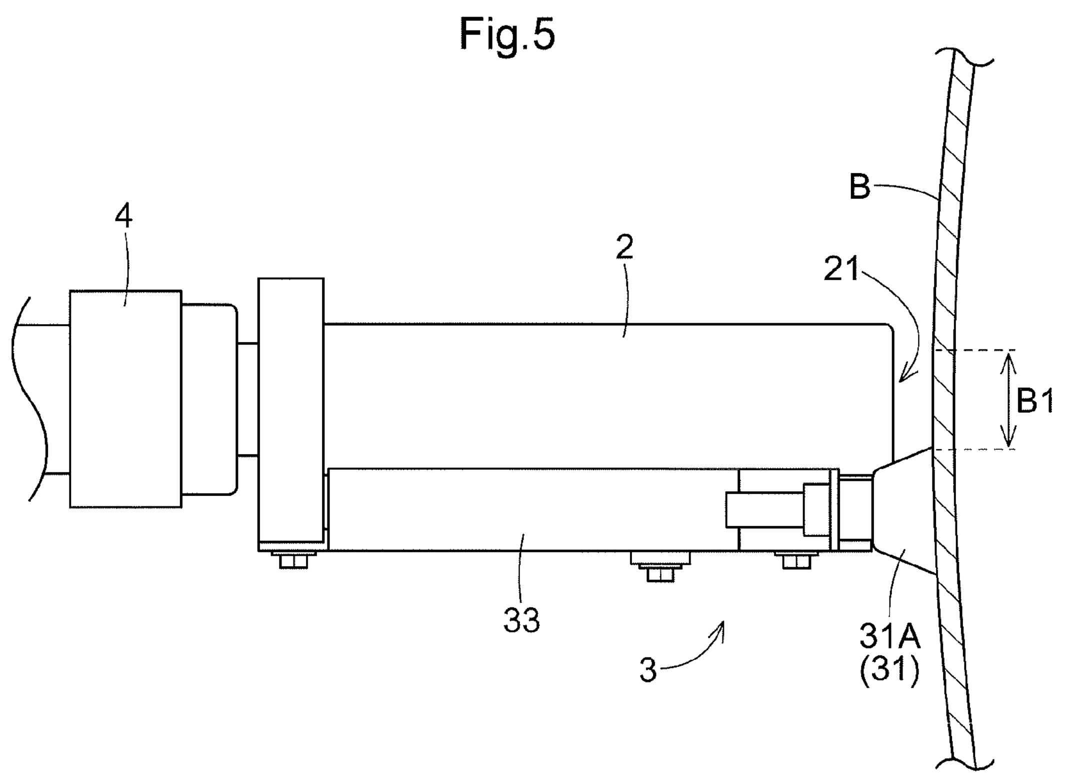
FIG. 5 is a view illustrating the positional relationship between the detector and the sucker, and a bumper after a first stage.

When the suckers 3 are brought closer to the bumper B (measurement site B1), the suction pads 31 are closer to the bumper B before the detector 2. When the distance between the suction pads 31 and the bumper B decreases, the suction force of the suction pads 31 acts on the bumper B, and the bumper B is attracted to the suction pads 31 (FIG. 5, sucking step).

(2) Second Stage

Figure 6:
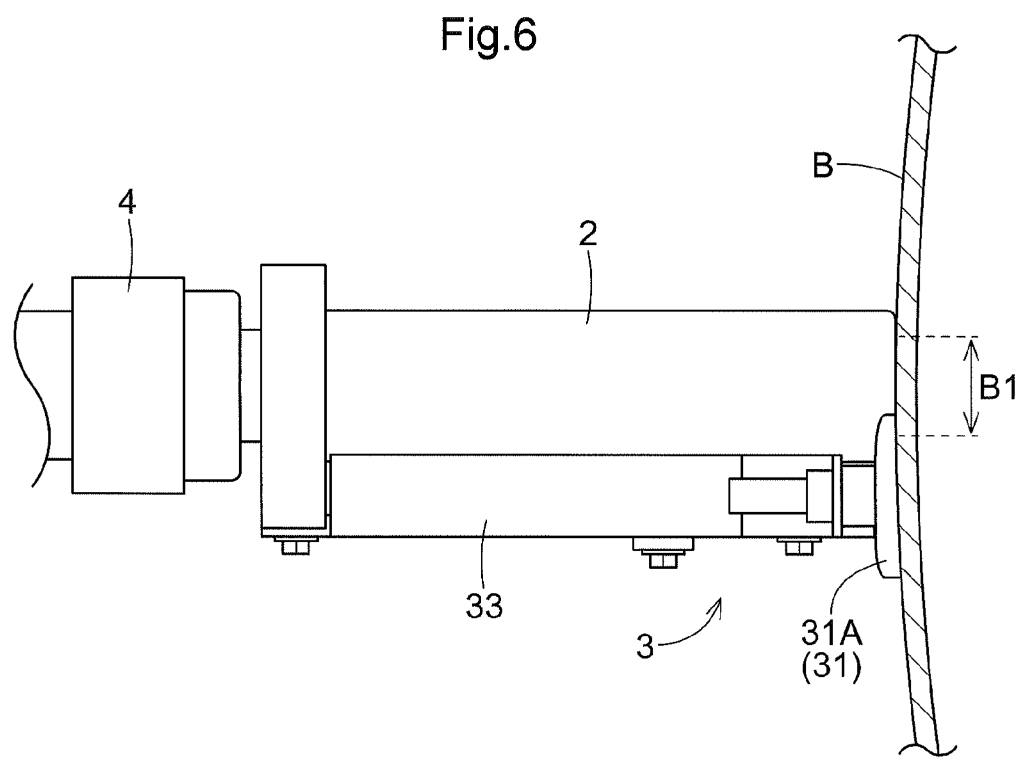
FIG. 6 is a view illustrating the positional relationship between the detector and the sucker, and the bumper after a second stage.

The bumper B attracted to the suckers 3 (suction pads 31) is attracted to the contact surface 21, thereby completing a state in which the contact surface 21 contacts the measurement site B1 in an appropriate attitude and with an appropriate force (FIG. 6). For example, the force making the detector 2 contact the bumper B can be controlled within an appropriate range by controlling the suction force of the suction pads 31 by a method including adjusting the output of the ejectors 32, for example. The appropriate attitude as used herein is determined by the specification of the detector 2, for example, but typically is specified as an attitude in which the detector 2 perpendicularly contacts the bumper B or an attitude in which the contact surface 21 faces the measurement site B1, for example.

(3) Third Stage

Thereafter, the detector 2 is operated to detect the surface condition of the bumper B (measurement site B1) (detection step). When the detector 2 is a colorimeter, for example, the color tone measurement is likely to be affected by ambient light. Therefore, the entrance of the ambient light into the contact surface 21 is desirably prevented to perform an accurate measurement. In this embodiment, the color tone is easily accurately measured because the attitude of the detector 2 and the bumper B is regulated to an attitude in which the contact surface 21 faces the measurement site B1, achieving a state in which the ambient light is difficult to enter the receiver 23.

When the detector 2 is an ultrasonic thickness gauge, for example, the coating thickness is determined based on the time until an ultrasonic wave transmitted by the transmitter 22 is reflected on a base of the bumper B and detected with the receiver 23. Therefore, the contact surface 21 desirably faces the measurement site B1 to accurately measure the thickness of the coating film. In this embodiment, the thickness of the coating film is easily accurately measured because the attitude of the detector 2 and the bumper B is regulated to the attitude in which the contact surface 21 faces the measurement site B1.

OTHER EMBODIMENTS

Finally, other embodiments of the inspection device and the inspection method according to the present invention are described. The configuration disclosed in each embodiment below is applicable in combination with the configurations disclosed in other embodiment insofar as no contradiction arises.

The embodiment above describes the configuration in which the two suckers 3 (3A, 3B) are provided as an example, but the number of the suckers is not limited in the present invention. However, the plurality of suckers is preferably provided because the attitude of the measurement object sucked to the suckers is easily stabilized. When the plurality of suckers is provided, it is preferable that the suckers each can be independently controlled to be operated or not to be operated. For example, when three or more suckers are provided and the suckers each are controlled to be operated or not to be operated according to the shape of a measurement target portion of the measurement object, the appropriate measurement attitude of the detector is easily achieved regardless of the shape of the portion.

Figure 7:
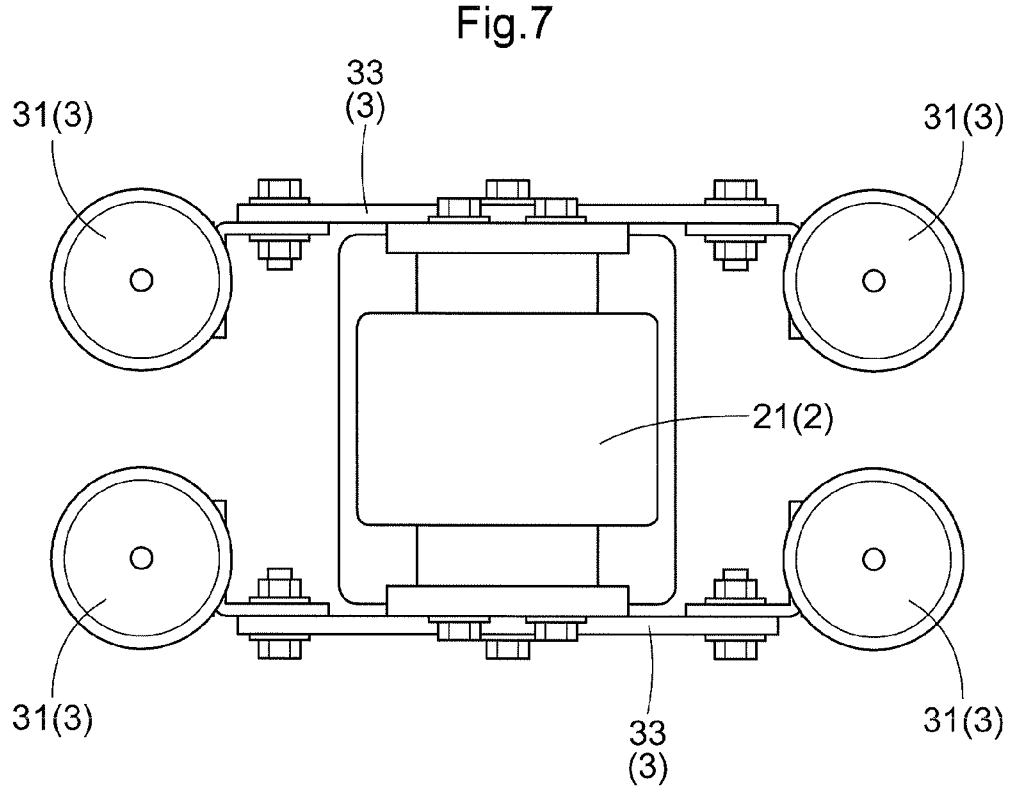
FIG. 7 is a view illustrating the arrangement of a detector and suckers in a modification.

FIG. 7 illustrates a modification in which four suckers are provided. FIG. 7 illustrates the positional relationship between the detector 2 (contact surface 21) and the suckers 3 (suction pads 31) in the same perspective as that of FIG. 3. In an inspection device according to this modification, the four suckers 3 (suction pads 31) are provided at positions corresponding to the four vertices of a rectangle, and the detector 2 (contact surface 21) is provided at the position corresponding to the center of the rectangle.

The embodiment above describes the configuration in which the two suction pads 31A, 31B are provided to be arranged at positions where a plane is defined with the contact surface 21 as an example, but the present invention is not limited thereto. For example, the single sucker may be acceptable as described above. In this case, it is clear that the contact surface and the suction pad (single) do not define a plane. Further, also when the contact surface is arranged on a line segment connecting the two suction pads, these three points do not define a plane.

The embodiment above describes the configuration in which the detector 2 and the suckers 3 are held by the robot arm 5 as an example. However, the inspection device according to the present invention may have a configuration of not including the robot arm. For example, a portable inspection device including the detector and the sucker is also one embodiment of the present invention. Also in this case, the positional relationship between the measurement object and the detector can be regulated by the sucker, and therefore the appropriate measurement attitude is more easily achieved as compared with a conventional portable inspection device. Further, when the measuring instrument, which is the contact-type measuring instrument, is pressed against the measurement object, a force for pressing the measuring instrument and the measurement object from the rear side of the measurement object is not required.

The present invention may be configured such that the measurement can be performed also by a method including pressing an inspection unit against the measurement object (i.e., the same method as that of the conventional inspection device) instead of the method including causing the suckers to suck the measurement object as described above. In this case, the suckers are preferably configured to be movable in the forward and backward directions such that the relative position between the detector (contact surface) and the suckers (suction pads) can be selected according to the measurement method to be carried out. When the latter method is adopted, it is desirable to take measures to press the measuring instrument and the measurement object on the rear side of the measurement object to prevent the movement and the deformation of the measurement object against which the inspection unit is pressed. Specifically, a method of arranging a support member (not illustrated) on the rear side of the measurement object, placing a hand on the rear side, or the like can be adopted. However, the measures are not required in some cases depending on conditions, such as the rigidity of the measurement object.

The embodiment above describes the configuration of including the scanner 6 as an example of the position detector as an example. However, the presence or absence of the position detector is optional in the present invention. When the position detector is provided, cameras, phototubes, and the like may be used besides the scanner exemplified above.

The embodiment above describes the configuration in which the inspection device 1 includes the force sensor 4 as an example, but the presence or absence of the force sensor is optional in the present invention.

Regarding other configurations, it should be understood that the embodiments disclosed in this specification are all examples in all the respects, and do not limit the scope of the present invention. Those skilled in the art will easily understand that modifications can be made as appropriate without departing from the gist of the present invention. Therefore, other embodiments that have been modified without departing from the gist of the present invention are also naturally included in the scope of the present invention.

DESCRIPTION OF THE REFERENCE NUMERALS

1 inspection device
2 detector
21 contact surface
22 transmitter
23 receiver
3 sucker
31 suction pad
4 force sensor
5 robot arm
6 scanner
7 controller

What is claimed is:

1. An inspection device comprising:

a detector including a transmitter configured to transmit a transmission wave to a measurement object, a receiver configured to receive a return wave generated as a result of the transmission wave hitting the measurement object, and a contact surface for contact with the measurement object; and at least one sucker, which is positioned ahead of the contact surface in a pre-contact state that occurs prior to the contact surface contacting the measurement object, configured to suction the measurement object such that the measurement object contacts the contact surface to regulate respective positions of the measurement object and the detector relative to each other.

2. The inspection device according to claim 1, wherein the at least one sucker includes a plurality of suckers.

3. The inspection device according to claim 2, wherein each sucker of the plurality of suckers is independently controllable to operate or not.

4. The inspection device according to claim 2, wherein
each sucker of the plurality of suckers has a respective suction pad,
each suction pad is configured to come into contact with the measurement object, and
at least two of the suction pads define a plane together with the contact surface.

5. The inspection device according to claim 1 further comprising:
a driver configured to hold and move the detector and the sucker;
a position detector configured to detect a position of the measurement object; and
a controller configured to control at least the driver, wherein
the controller is configured to control the driver to move the detector and the sucker to the position detected by the position detector.

6. The inspection device according to claim 5, wherein the driver includes a robot arm.

7. The inspection device according to claim 5, wherein
the detector further includes:
a force sensor configured to measure a force with which the detector is in contact with the measurement object, wherein
the driver is configured to move the detector such that the force measured by the force sensor is within a predetermined range.

8. An inspection method involving use of an inspection device including:
a detector including a transmitter configured to transmit a transmission wave to a measurement object, a receiver configured to receive a return wave generated as a result of the transmission wave hitting the measurement object, and a contact surface for contact with the measurement object; and
a sucker, which is positioned ahead of the contact surface in a pre-contact state that occurs prior to the contact surface contacting the measurement object, configured to suction the measurement object,
the inspection method comprising:
suctioning the measurement object such that the measurement object contacts the contact surface; and
detecting a condition of a surface of the measurement object suctioned by the sucker.

9. The inspection method according to claim 8, wherein
the inspection device further includes:
a driver configured to hold and move the detector and the sucker;
a position detector configured to detect a position of the measurement object; and
a controller configured to control at least the driver,
the inspection method further comprising, before suctioning the measurement object by the sucker:
detecting the position of the measurement object with use of the position detector; and
controlling, with use of the controller, the driver to move the detector and the sucker to the position detected with use of the position detector.

10. The inspection method according to claim 9, wherein the driver includes a robot arm.

11. The inspection method according to claim 9, wherein
the detector further includes:
a force sensor configured to measure a force with which the detector is in contact with the measurement object,
the inspection method further comprising:
moving the detector such that the force measured by the force sensor is within a predetermined range.

12. An inspection device comprising:
a detector including a transmitter configured to transmit a transmission wave to a measurement object, a receiver configured to receive a return wave generated as a result of the transmission wave hitting the measurement object, and a contact surface for contact with the measurement object;
at least one sucker configured to suction the measurement object such that the measurement object contacts the contact surface to regulate respective positions of the measurement object and the detector relative to each other;
a force sensor configured to measure a magnitude of force with which the detector applies to the measurement object; and
a driver configured to hold and move the detector and the sucker,
wherein the driver is configured to move the detector, based on the magnitude of force measured by the force sensor, such that the magnitude of force measured by the force sensor is specified as an attitude in which the detector perpendicularly contacts the measurement object or an attitude in which the contact surface faces the measurement site.

13. The inspection device according to claim 12, wherein the at least one sucker includes a plurality of suckers.

14. The inspection device according to claim 13, wherein each sucker of the plurality of suckers is independently controllable to operate or not.

15. The inspection device according to claim 13, wherein
at least two suckers of the plurality of suckers have a respective suction pad, and
at least two of the suction pads define a plane together with the contact surface.

16. The inspection device according to claim 12, wherein the driver includes a robot arm.

* * * * *